United States Patent Office 2,944,034
Patented July 5, 1960

---

2,944,034

DIALDEHYDE SUGAR REACTION PRODUCTS, PROCESS FOR PREPARING SAME AND PRINTING INK PREPARED THEREFROM

Ronald J. Baird, Philadelphia, Pa., assignor to The National Sugar Refining Company, New York, N.Y., a corporation of New Jersey No Drawing. Filed Jan. 4, 1956, Ser. No. 557,253

20 Claims. (Cl. 260—9)

This invention is that of the process of preparing the solvent-soluble products of the condensation, at an elevated temperature and with the elimination of water, between a dialdehydic substance (as defined below) and a sugar having at least four hydroxyl groups. The hydroxyl groups of the sugar should occur in pairs, and each hydroxyl group in a pair be linked to a separate carbon. Then each two carbon atoms, to which are linked respectively the two hydroxyl groups of such a pair, adjoin one another or are separated only by one intervening carbon atom. In other words, the hydroxyl groups in each pair should be separated from one another by no more than three carbon atoms; or stated otherwise, by less than four carbon atoms.

In addition, the ratio of the specific sugar used to the dialdehydic substance used should be such that there are no less than three moles of hydroxyl group per mol of the dialdehydic substance used. In other words, there should be used no more than one mol of the dialdehydic substance for each three moles of hydroxyl group in the specific sugar. Obviously, there is one mol of hydroxyl group in each mol of any specific sugar for each hydroxyl group in it. For example, since sucrose has eight hydroxyl groups, then each mol of sucrose provides eight moles of hydroxyl group.

It is especially advantageous that the ratio of the specific sugar to the dialdehydic substance be such that there are no less than about four moles of hydroxyl group per mole of the dialdehydic substance.

While solvent-soluble resin products of the invention are produced by using the indicated minimum molal excess of the sugar hydroxyl groups (that is to say, in the form of a sugar having at least four hydroxyl groups that occur in pairs), products having useful properties and included in the invention can be obtained by using smaller proportions of aldehydic substance. For example, with certain combinations of reactants even a relatively small amount of the dialdehydic substance can be used, yet a minimum for it cannot be set specifically. In general, it can be indicated for such a combination from one or merely a few control test trials. Generally useful products can be obtained by a ratio of such aldehydic substance to provide up to about sixteen moles of hydroxyl group per mole of the dialdehydic substance, and advantageously useful products when the ratio is such as to provide up to about twelve moles of hydroxyl group per mol of the dialdehydic substance.

The invention embraces especially the preparation of such solvent-soluble products by conducting the condensation in the presence of an acid condensation catalyst. In general, the catalyst should not exceed about one-tenth mol per mol of total condensing reactants.

Also as part of the invention are the solvent-soluble condensation products of the process of the invention.

A characteristic feature of these products resides in their capacity to be converted, for example, by heating in presence of an acid catalyst, to a solid adherent form. As a result, dissolving the products of the invention in suitable solvents gives solutions from which to make films which thereafter can become insoluble and manifest good binding power.

Thus, a valuable use of the products of the invention is as a resin ingredient, to serve as a binder for printing inks that are to be set by heat. Another use of them is in paper-making to increase the wet strength of the paper, for example, by adding the selected one in solution to the pulp, or at the press box, by applying it as a five percent, or other concentration, solution. In addition, they can be used in coating compositions for coating paper, and in coating the surfaces of wood, metals, textiles, building materials, and other products.

In other uses, they can serve as hot melt adhesives for paper products, such as cardboard, and wax paper, or as a binder for molding sands. In these, their thermo-setting nature can be made use of, for example, either by dissolving the product in a suitable solvent and coating the sand with the product in that way, or by powdering the product and admixing it in a suitable proportion, e.g. six percent, with the sand.

The process of the invention can be conducted with any sugar having at least four hydroxyls and located with respect to one another as described, or any mixtures of any such sugars. Thus, the sugar can be any of the various sugars such as a monosaccharide sugar, as dextrose (glucose, grape sugar, or starch sugar), mannose, levulose (fructose, honey sugar, or fruit sugar), invert sugar, galactose, and the like; or a di-saccharide sugar as sucrose (cane sugar, beet sugar), lactose (milk sugar), or maltose; or a trisaccharide sugar as raffinose; or in addition the various hexoses, or pentoses, for example, xylose, ribose, or arabinose; or oligosaccharides, and other sugars having at least four hydroxyls and arranged as described.

The source of such sugar or mixtures of then is immaterial. Thus, commercial sugar-containing products can also be used where any non-sugar impurities in them may separate out as filterable insolubles in some step of the process or are not detrimental in the ultimate application of the product, if they are not removed. It is possible to use a liquid product such as corn syrup, or pasty products such as molasses, and the like. It is possible even to use various types of waste products or by-products of other industries, which contain applicable sugars or mixtures of any of them, such as spent sulfite liquor, or saccharified wood waste as saccharified sawdust, as the sugar providing starting material. Such products can be used directly or with more or less pretreatment to rid them of undesirable or inactive portions.

In any event, all of them, insofar as their applicable sugar content is concerned, are included in the foregoing reference to a sugar of the type described as a reactant in the process of the invention. Accordingly, the expression "a sugar" as used generically herein refers to any of the pure sugars as well as to any of these commercial sugar-containing products or industrial waste or by-products that contain one or more sugars along with other non-sugar substances.

The applicable dialdehydes have the structural formula

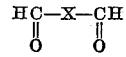

wherein X can be nothing so that the carbons of the two aldehydes are linked directly and the aldehyde is glyoxal; or X can be one or more intervening divalent atoms or groups. Any such group can be a straight or branched chain, saturated or unsaturated, or cyclo-aliphatic or an aromatic mononuclear or binuclear residue.

Any dialdehyde can be used so long as it has no group that would enter into a side reaction or might compete for reaction with the hydroxyls of the sugar. However, those skilled in this art would know how to block any group that under some conditions might enter into an undesirable side reaction or interfere with the desired linkage. For example, a carboxyl group, if undesirable, could be converted to an alkali metal carboxylate or esterified and thus blocked. Then such alkali metal cation later could be removed by suitable obvious treatment with mineral acid, followed by washing out the resulting water-soluble salt. If a dialdehyde having an amino group is to be used, that group can be blocked for example, by being acetylated, and the acetyl group later removed by hydrolysis. Alternatively, one could forego using such carboxyl or amino substituted dialdehyde.

Thus, the dialdehyde can be aliphatic and otherwise unsubstituted as in glyoxal, malonaldehyde (malonic dialdehyde), glutaraldehyde, adipaldehyde, and succinic dialdehyde; or substituted, for example, hydroxy-substituted as in alpha-hydroxyadipaldehyde; or alkyl and/or alkoxyalkyl substituted as in 3-methylglutaraldehyde, methyl succinaldehyde, alpha-propyladipaldehyde, beta-ethoxyglutaraldehyde, and alpha,gamma-dimethyl-alpha-methoxymethyl glutaraldehyde; or a keto-aldehyde as beta-ketoglutaraldehyde; or aromatic, for example, mononuclear as in the phthalaldehydes as terephthalaldehyde, phthalaldehyde and isophthalaldehyde, and the like.

In place of any of the dialdehydes, there can be used any substance other than a dialdehyde, which on hydrolysis yields a dialdehyde, which are called dialdehyde precursors. They and the dialdehydes per se are intended by the generic expression "a dialdehydic substance" used in the first paragraph of this specification.

Examples of dialdehyde precursors are: The acrolein dimer or 3,4-dihydro-1,2-pyran-2-carboxaldehyde. It undergoes ring cleavage by the action of water in presence of an acid catalyst to give alpha-hydroxyadipaldehyde. The hydrolysis of 2-ethoxy-3,4-dihydro-1,2-pyran gives glutaraldehyde, while 2-ethoxy-4-methyl-3,4-dihydro-1,2-pyran yields 3-methyl glutaraldehyde. Succinic dialdehyde results from hydrolysis of 2,5-diethoxy tetrahydrofuran. Also, 1,1,3,3-tetraethoxypropane on hydrolysis yields malonic dialdehyde.

Any of the dialdehydes can be used alone or with some other of them. Likewise, any of the dialdehyde precursors can be used alone or with some other of them or any of the dialdehydes. The dialdehyde precursors vary in their stability. Some are more desirable than others which may show some side reaction that can darken the end product. Some of the precursors react directly with the sugar. Others may require the inclusion of water in the reaction mixture apparently merely the more easily to provoke the desired transformation of the precursor.

Thus, the dialdehydic substance can be considered as an oxygen-containing organic substance that can provide a carbonyl group under the reaction conditions, and which is selected from the class consisting of a dialdehyde and a precursor of a dialdehyde. In cases where the precursor is not soluble in the reaction vehicle used, the sulfite of the precursor can be used, for example, to provide solubility in water.

Good products of the invention can be prepared by using substantially equimolal proportions between the reactants, i.e. the sugar and the dialdehydic substance. Therefore, it is beneficial in many cases to use about equimolal proportions, such as about one mole of the dialdehydic substance per hexose unit mole, or per mole of pentose. One mole of dialdehydic substance per mole of such sugar unit yields advantageously effective products. Some slight variation from this indicated proportion can be used, for example, with the dialdehydic substance up to twenty percent in such molar excess. However, it is best that it does not pass about ten percent in such molar excess.

The reaction needs to run at an elevated temperature, with a minimum at least about 50° C. Based on variations in reactivity of sugar to sugar and from one dialdehydic substance to another, and on other reaction medium conditions, the minimum cannot be the same for all. In some cases, it can be somewhat less. It needs to be sufficient for the reaction to run at a practical rate, easily noted by a simple control run, and advantageously to reach completion usually at most in somewhere about five hours and most generally not to exceed six hours. It is advantageous in most cases to operate at at least about 70° C., and in some other cases even higher, for example, with molasses or dextrose to use steambath temperature.

The maximum temperature, for whatever pressure and other conditions prevail, should be under that at which degradation or decomposition of either reactant occurs. That will vary according to the particular sugar used. It is generally limited by, and should be under, that at which the sugar can decompose, as by charring or dehydration. That also can be determined readily by a simple control run or test.

It is highly advantageous that the reaction take place in a liquid medium that is a solvent for at least one of the reactants. Thus, the reaction medium can well be aqueous, and desirably so when the dialdehydic substance is a precursor. Under certain conditions, it may be best for it to be organic, e.g. by using an organic solvent at least for the dialdehydic substance reactant. In any event, the reaction should be conducted in a non-basic solvent or reaction medium. Obviously, by such "non-basic" solvent or reaction medium is meant one that may be neutral or acid, and not have a pH above 7, i.e. it should not be on the alkaline or basic side.

The condensation reaction of the invention, involving the elimination of water between its essential reactants, i.e. the sugar and the aldehydic substance, can be conducted in the suitable liquid reaction medium under atmospheric pressure at a sufficiently elevated temperature, without a catalyst. When not using a catalyst, it is beneficial to operate also at a superatmospheric pressure.

Ordinarily, there is no need to operate above atmospheric pressure when an acid catalyst is used. Thus, it is a distinctly advantageous modification of the process of this invention to conduct this condensation while having the reaction medium acid reactive, i.e. at a pH significantly below 7, as by the use of an acid catalyst. The catalyst can be inorganic such as a strong mineral acid as sulfuric acid or hydrochloric acid, or an acid-reacting salt such as an acid sulfate as an alkali metal bisulfate as sodium or potassium bisulfate or ammonium bisulfate or sulfamic acid, or halide salt as an alkaline earth halide as calcium chloride, or ammonium chloride, or other divalent metal salt as zinc chloride, or trivalent metal salt as ferric or aluminum chloride, or boron trifluoride, or boron fluoride etherate, or other alkali metal acid salt such as sodium, potassium, or even ammonium, phosphate. The sulfo-acid catalyst, illustrated by sulfuric acid, an acid sulfate and sulfamic acid, includes also a strong organic sulfo-acid such as an aromatic sulfo-acid as a mononuclear sulfonic acid as benzene sulfonic acid, phenol sulfonic acid, and toluene sulfonic acid (which sulfonic acids are particularly suitable), and also a binuclear sulfo-acid as a naphthalene sulfonic acid, for example, a naphthalene disulfonic acid, or an aliphatic sulfo-acid such as an alkylsulfonic acid.

The quantity of acid catalyst will vary with the reactants used, or reaction conditions such as the temperature. However, it need only be sufficient effectively to catalyze the condensation with elimination of water under the reaction conditions. It can then be as little or less than about one or two tenths of a percent of the total weight of reactants used, or about one-quarter to one-half percent of them, although a percent or two of such total weight could be used. The amount of catalyst thus is merely a small percentage, in the range indicated, of the total weight of reactants used. In any event, the amount of the acid catalyst should not exceed one-tenth mole per mole total reactants. It is thus less than that which could decompose the sugar by charring or dehydration.

The anion of the catalyst takes no essential part in the reaction. It is desirable to select a catalyst whose anion leaves in the reaction product no constituent that it would be objectionable to have in it.

When water is used in the reaction vehicle, it needs to be removed, for example, during the course of the reaction, say by distillation preferably under reduced pressure, or by azeotropic distillation or other effective method. If a precursor was used as the dialdehydic substance, any methanol or ethanol formed as a result of its hydrolysis should be similarly removed at the same time.

It is requisite that the water produced as a result of the condensation in the course of the reaction be removed, for example, in similar manner usually simultaneously.

It is ordinarily not necessary to neutralize any acid catalyst used and remaining at the completion of the condensation producing the solvent-soluble products of the invention. This is advantageous in the ultimate applications made of these products, for they generally depend on the further reaction of these products to a thermo-set form. Then, often it is desirable to add more catalyst to the product to enhance the completion of the thermo-setting in as short a time and as low a temperature as possible.

The invention can be explained by a theory which should not be construed so as to limit the invention. According to this theory, one of the aldehyde groups in a molecule of dialdehyde forms a cyclic acetal linkage with one pair of hydroxyl groups in a sugar molecule. The other pair of hydroxyl groups forms a cyclic acetal linkage with one of the aldehyde groups of a second molecule of dialdehyde, while the other aldehyde group in the first molecule of dialdehyde links in a similar way with a pair of hydroxyl groups in a second molecule of sugar. Thus, a chain of alternate dialdehyde and sugar residues linked through cyclic acetal formation is produced with elimination of water. This may be seen from the structural formula:

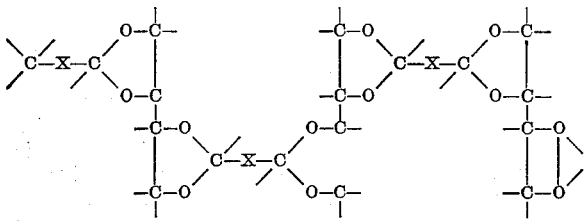

Before a high degree of polymerization is reached the product is generally a soft resin soluble in solvents. On heating in the presence of acid catalysts the product becomes tough and hard and insoluble in aqueous media. This property is a particularly valuable one in the making of a novel printing ink of the invention, for it enables an aqueous or water-soluble vehicle to be used and thereby provides an ink having desirable properties and capabilities and which, after the printing has been done, may be immediately set by heating.

A practical printing ink can be prepared by working in the usual manner, as by milling, between about fifteen and about twenty parts of a good printing ink pigment such as carbon black or lithol red into a suitable vehicle comprising one of the resin products of this invention dissolved, with heating if necessary, in a suitable solvent for it. The solvent used in about thirty-five to about fifty parts will depend on the solubility properties of the product of this invention selected as the resin. Propylene glycol, or water, or an aqueous solution of hexylene glycol, or any other solvent indicated respectively in the resin product Examples 2 through 17 below, can be used. From about thirty-five to forty-five parts of the selected resin product of this invention can be used. Then there are worked in from about six to nine parts of acid catalyst, toward the end of the working cycle. If a water-cooled mill is used, the catalyst can be incorporated earlier.

The printing inks of this invention are illustrated by, but not restricted to, the following formulation, worked up by the process just described:

*Example 1.—Printing ink*

| | |
|---|---|
| Carbon black | 15% to 20%. |
| Glyoxal sucrose resin (soluble) (condensation product of Example 5) | 40%. |
| Propylene glycol | 40% to 45%. |
| Boron fluoride etherate | 7.5% of resin. |

Other formulations may be similarly, or otherwise suitably, prepared.

The process of the invention and the resulting resin, or condensation, products, of the invention are illustrated by, but not restricted to, the following examples:

*Example 2.—Sugar and phthalic dialdehydes*

A mixture of 68.4 grams (0.2 mole) of powdered sugar, 72 grams (0.4 mole as aldehydes) of mixed ortho-, meta- and para-isomers of phthalic aldehydes (analyzing 74% dialdehyde), 150 milliliters of dioxane, and 1 milliliter of a 65% aqueous solution of phenol sulfonic acid was heated at 70°–75° for two hours. 14 grams of gummy residue was removed and discarded. The solution was cleared by shaking up with anhydrous magnesium sulfate, filtered, and concentrated by evaporation of the solvent to give 115 grams of a clear, soft resin of light yellow color. It was soluble in methyl, ethyl, and butyl alcohols, and in propylene and hexylene glycols. It was partly soluble in ethyl acetate, acetone, methyl ethyl ketone; slightly soluble in water, benzene, and toluene; insoluble in ether or n-heptane. The resin had a specific gravity of 1.10. Films made by baking solutions of this resin in glycols became hard, brittle and insoluble, with considerable darkening.

*Example 3.—Anhydrous glucose and phthalic dialdehydes*

In Example 2, its sucrose was replaced by the equivalent molecular proportion of anhydrous glucose (36 grams). The resulting condensation resin product had properties similar to those of the product of Example 2, but better heat stability. Also, films made by baking solutions of it did not darken much.

*Example 4.—Sucrose and terephthalaldehyde*

To a solution of 91 grams (.679 mole) of terephthalaldehyde dissolved in 250 milliliters of tetrahydrofurane were added 100 grams (.292 mole) of powdered sucrose and 1 gram of toluene sulfonic acid. The mixture was heated at 70° C., with stirring, for 5½ hours. An insoluble, gummy residue, weighing 30 grams, was removed. The solution was neutralized with powdered sodium bicarbonate, filtered, and concentrated to yield 125 grams of a wax-like resin. It was soluble in propylene and other glycols, in methanol, ethanol, and butanol, and in acetone and methyl ethyl ketone.

*Example 5.—Cane sugar and glyoxal*

A mixture of 720 grams (2 moles) of 95% raw cane sugar and 384 grams of a 30.2% aqueous solution of glyoxal (2 moles) was stirred in a flask on a steam bath about a quarter of an hour until all the sugar dissolved. Then 10 milliliters of a 65% aqueous solution of phenol sulfonic acid were added, and the mixture heated on a steam bath, while being stirred and water was evaporated off under 23 inches of vacuum. After about 1¼ hours, the product was too viscous to stir further. Heating was continued, without stirring, in an oil-bath at 115°, for one-half hour longer. The product was removed while hot. On cooling it became hard and brittle. The yield was 830 grams. It was soluble in water and in propylene glycol.

*Example 6.—Glucose hydrate and adipaldehyde*

9.9 grams of glucose hydrate (.05 mole) was dissolved in 300 milliliters of an aqueous solution containing 5.7 grams of adipaldehyde (.05 mole). 1.5 milliliters of 65% phenol sulfonic acid solution were added, and the mixture was heated on a steam bath, while at the same time the water was allowed to distill off during 4 hours. The residue, weighing 17.7 grams, was a clear, water-soluble resin which could be dehydrated by further heating, under reduced pressure, to produce a brittle solid having reduced solubility in water. It was soluble in propylene glycol and other glycols.

*Example 7.—Glucose hydrate and adipaldehyde*

Example 6 was repeated using a solution of adipaldehyde in aqueous sulfurous acid instead of an aqueous solution of the dialdehyde, with relatively similar resulting product.

*Example 8.—Corn syrup and glyoxal*

110.7 grams of corn syrup of 43° Bé (carbohydrate equivalent to 0.5 mole of glucose), 96 grams of 30.2% aqueous glyoxal (equivalent to 0.5 mole of glyoxal) and 2 milliliters of 65% phenol sulfonic acid, were stirred together in a resin flask set for distillation under 23 inches of vacuum. The flask was heated by an oil-bath. The temperature of the bath was raised from 110° to 150° C. in about 1 hour. The product, which weighed 145 grams, was a clear, soft resin, soluble in water.

*Example 9.—Sugar and alpha-hydroxyadipaldehyde*

34.2 grams of sugar (0.1 mole) were dissolved in 23.6 grams of a 55% aqueous solution of alpha-hydroxyadipaldehyde (0.1 mole) by stirring and heating in a water bath held at about 85° during 1 hour 25 minutes. To the clear solution was added 0.1 milliliter of 65% phenol sulfonic acid. Heating was continued at the same temperature while distilling off the water under 23 inch vacuum for 15 minutes, and under the higher vacuum from a high-vacuum pump for 10 minutes. The yield was 51.2 grams.

The product was mostly resinous, and partly powdery. It was soluble in water, methyl and ethyl alcohols, propylene glycol and 2-methyl-pentanediol-2,4 (hexylene glycol). It was insoluble in butanol, acetone, ethyl acetate, benzene, n-heptane, and carbon tetrachloride.

The loss of volatile matter after 30 hours under reduced pressure at 70° was 12%. The average molecular weight of the powdery part of the sample was 381. The viscosity of an aqueous solution of 1.163 specific gravity (at 20° C.) was 102 centipoises. The film formed by baking a solution of the product in propylene glycol, with the addition of a small amount of boron fluoride etherate, was insoluble in water.

The sugar used in any of the foregoing examples can be replaced by the respective molar equivalent of any of the other sugars described as applicable in the process of the invention. So also, the particular dialdehyde in any of them likewise can be replaced by the respective molar equivalent of any of the other dialdehydes indicated to be applicable. For example, repeating Example 6, but replacing the adipaldehyde with its stoichiometric equivalent of glutaraldehyde, yields a product relatively similar to that of Example 6. It is also possible to replace the dialdehyde by a molal equivalent of a precursor for a dialdehyde as illustrated in, but not restricted to, the following examples:

*Example 10.—Anhydrous glucose and 2-ethoxy-4-methyl-3,4-dihydro-1,2-pyran*

36 grams (0.2 mole) of glucose (anhydrous dextrose) were dissolved in 30 milliliters of water in a reaction vessel equipped with sealed mechanical stirrer and a condenser that could be set either for refluxing or for distillation at atmospheric or under reduced pressure. The solution was acidified with 0.25 gram of toluene sulfonic acid, and then mixed with 42.6 grams (0.3 mole) of 2-ethoxy-4-methyl-3,4-dihydro-1,2-pyran having a boiling range of 157–159° C.

The mixture was stirred vigorously under reflux condenser for four and one-half hours while being heated by a water bath surrounding the reaction vessel. The temperature of the bath was 65° C. at the start, and gradually was raised to 80° C. by the end of that time. The condenser then was set for distillation and, with the water bath at 80° C., the reaction mixture was concentrated under 23 inches of vacuum for 2 hours, yielding at this stage a soft, fusible resin.

To complete the drying of this resin product, it was dissolved in 180 milliliters of anhydrous ethanol, and the solution again was concentrated, at first at atmospheric pressure and finally under reduced pressure as before. The final yield was 69 grams.

The product is elastic while hot, and even when cold exhibits some resiliency before breaking. Its softening point is somewhat below 100° C. It is soluble in methanol, and ethanol, acetone, ethylene glycol monomethyl ether, and ethylene glycol monobutyl ether; and insoluble in water. Films prepared from solutions of this product in any of its solvents and cured at 95 to 115° C. become partly insoluble in methanol after one-half hour at such temperature. The film prepared from a solution of the product in ethylene glycol monobutyl ether and cured at 150° C. is tough, brittle and insoluble in that solvent.

*Example 11.—Sucrose and 2-ethoxy-4-methyl-3,4-dihydro-1,2-pyran*

34.2 grams (0.1 mole) of sucrose were dissolved in 30 milliliters of water and reacted with 28.4 grams (0.2 mole) of 2-ethoxy-4-methyl-3,4-dihydro-1,2-pyran, in the presence of 0.4 milliliters of 65% phenol sulfonic acid, in a reaction vessel as in Example 10, for one-half hour with the water bath at 75–80° C. The reaction mixture then was concentrated under 22 inches of vacuum for one and three-quarter hours. The product then became too viscous to stir and solidified on cooling. The yield was 59 grams. This product is completely soluble in methyl and ethyl alcohol, and in acetone. A part of it is soluble in water. From solutions of this product in these solvents for it, there are obtained after curing by heat, clear, hard, tack-free films which are insoluble in these solvents. On soaking in water, these films become cloudy. This clouding evidently is due to a water-soluble fraction which may be unreacted sugar or a by-product of the reaction.

*Example 12.—Sucrose and 2-ethoxy-4-methyl-3,4-dihydro-1,2-pyran (without catalyst)*

A stainless steel pressure vessel provided with a stirrer and heating mantle was charged with 85.5 grams (0.25 mole) of powdered sugar and 71 grams (0.5 mole) of 2,3-dihydro-4-methyl-2-ethoxy-4-pyran. The stirrer was started and the heat turned on and fed at such a rate that the temperature rose to 80° C. after 35 minutes, to 140° C. after 1 hour and 35 minutes, and to 168° C. after 2 hours and 35 minutes. The pressure by this time was 15 lbs. per square inch gauge. The temperature thereafter was held at 165–170° C., while the pressure gradually rose to 80 lbs. per square inch by 5 hours and 35 minutes from the start of the heating.

The heat and stirrer then were turned off, and the vessel was allowed to cool. The product, consisting of a solid and a liquid, was dissolved in anhydrous ethanol and filtered to determine whether any sugar remained unreacted (sugar being insoluble in anhydrous ethanol). However, all of the product was dissolved. The pH of the alcoholic solution was 4.9. It was evaporated to dryness, leaving 100 grams of a hard, brittle solid, soluble in methanol, ethanol, ethylene glycol, diethylene glycol, and insoluble in water.

*Example 13.—Molasses and 2,3-dihydro-2-ethoxy-1,4-pyran*

33.0 grams (approximately 0.1 mole hexoses), of blackstrap molasses are diluted with 10 milliliters of water and mixed with 19.2 grams (0.15 mole) of 2,3-dihydro-2-ethoxy-1,4-pyran, and 5 milliliters of 65% phenol sulfonic acid added in a reaction vessel equipped with a stirrer and a condenser that can be positioned for refluxing and later for distillation. The reaction mixture is heated with stirring and under reflux over a steam bath for 1 hour, and then with the condenser moved to distillation position, heating of the reaction mixture is then continued with distilling off of water under 23 inches of vacuum for an hour and 50 minutes longer. The heating is discontinued. There remains a very viscous product that is fluid when hot and a brittle solid when cold. Yield 40.8 grams. While the product is insoluble in water, on soaking in water it becomes spongy and rubbery. This product may be used as a sealant for joints or as a hot melt adhesive for paper.

*Example 14.—(Next higher homolog of Example 13)*

The experiment along the lines of Example 13 is repeated with the same quantities of the same materials except to relace the pyran by 21.2 grams (0.15 mole) of its next higher homolog, 2,3-dihydro-2-ethoxy-4-methyl-1,4-pyran, and by distilling off water for 2¼ hours instead of an hour and 50 minutes as the only operating change. There was obtained 42 grams of a brittle, fusible product, somewhat soluble in ethanol, and leaving an insoluble residue (probably inorganic salts) on solution in ethylene glycol. The product is insoluble in water, but also becomes rubbery on soaking in it. After repeated water washings and then drying, this rubbery product becomes brittle but is still fusible.

*Example 15.—Carbohydrate concentrate from sulfite liquor and dihydromethylethoxypyran*

Fifty-two grams, containing 30 grams of solids and 22 grams of water, of a concentrated spent sulfite liquor from the paper industry, from which a substantial amount of its lignosulfonates had been removed, leaving a high percentage of carbohydrates, was acidified with 8 milliliters of 50% (by volume) sulfuric acid. This amount of acid was required to overcome the alkalinity of the impurities in the sulfite concentrate and bring down the pH to about 2. To this solution was added 28.4 grams (0.2 mole) of 2,3-dihydro-4-methyl-2-ethoxy-1,4-pyran. The mixture was stirred vigorously while being heated in a water bath held at 80–85° C.

After 2 hours' heating, the pyran had nearly all hydrolyzed, as shown by the disappearance of its separate layer. The water and ethyl alcohol formed then were removed by vacuum distillation, while continuing the stirring and heating at the same temperature as before for about 2 hours longer. At the end of this period, the product was too stiff to be stirred and the reaction was finished.

The product (48.3 grams) was flexible and elastic when hot; hard, brittle and slightly elastic when cold. It was soluble in hot water, methanol, ethylene glycol, and diethylene glycol; slightly soluble in cold water and in ethanol; and insoluble in toluene, n-butanol, and acetone.

A similar product can be obtained by using the whole spent sulfite liquor, without removal of its lignosulfonates. In such case, less acid needs to be added to catalyze the reaction.

Saccharified waste wood, such as saccharified sawdust, for example, as obtained by acid hydrolysis or splitting, can also be used as the carbohydrate starting material for this reaction. Such starting material contains pentoses from the pentosans in the wood as well as glucose from the hydrolysis of the cellulose.

A softer and tackier condensation product or resin can be obtained by the resulting co-condensation with the dialdehyde substance and replacing a minor part of the carbohydrate reactant by a molar equivalent amount of a diol wherein the hydroxyls are separated by at least three consecutively linked atoms. Such product is illustrated by, but not restricted to, the following examples:

*Example 16.—Sugar, diethylene glycol, and dihydromethyl-ethoxy-pyran*

A mixture of 51.3 grams (0.15 mole) of powdered sugar, 5.3 grams (0.05 mole) of diethylene glycol, and 28.4 grams (0.2 mole) of 2,3-dihydro-4-methyl-2-ethoxy-1,4-pyran was stirred and heated in an oil bath. After 4 hours with the bath temperature at 140° C., the temperature was raised to 150° C. and held for 2 hours and then to 160° C. for 1 hour. Water and ethanol formed during the reaction evaporated off during it. The product (70.5 grams) was clear, hard, brittle and tacky; soluble in water, methanol, ethanol, and in ethylene glycol; and insoluble in acetone.

*Example 17.—Spent sulfite liquor, diethylene glycol and dihydro-methyl-ethoxy-pyran*

A concentrated aqueous waste sulfite liquor from wood pulp, containing 30 grams of solids and 25 grams of water, was acidified with 2 milliliters of 50% (by volume) aqueous sulfuric acid. The pH was approximately 2 (by pH test paper). This solution was mixed with 5.3 grams (0.05 mole) of diethylene glycol and 32 grams (0.25 mole) of 2,3-dihydro-2-ethoxy-1,4-pyran (0.25 mole).

The mixture was reacted by stirring under reflux condenser in a bath at 80 to 85° C. for 3 hours, and then changing the condenser for distilling off the water and ethanol formed, under 23 inches of vacuum and continuing the reaction with stirring and heating for about 2 hours, when the product became too stiff to stir. The yield was 67 grams of a fairly hard and flexible solid, soluble in water, ethylene glycol, and diethylene glycol; and insoluble in methanol, ethanol, acetone, 2-ethoxyethanol, and toluene.

Using 1,4-butanediol instead of the diethylene glycol in Examples 16 and 17 gave products with little solubility in water.

As already indicated, in any of the various Examples 2 through 17, the specific sugar used can be replaced in whole or in part by any other applicable sugar or product containing such sugars as typified by the molasses and the sulfite liquor. Similarly, any dialdehyde precursor used in any of the examples can be replaced in whole or in part by the equivalent molal proportion of any other such applicable precursor or any of the applicable dialdehydes.

Likewise, any catalyst used in any of the examples can be replaced by the equivalent in acid catalytic activity (i.e. in such concentration as to provide the hydrogen ion concentration for the indicated rate of reaction) of any other compatible one of the indicated applicable catalysts. In those examples where the catalyst is stated to be 65% phenol sulfonic acid, the ordinary commercial product assaying 65 to 67.5% phenol sulfonic acid, 2.8% free $H_2SO_4$, 2% phenol, and the balance water is intended.

Just as the solution of adipaldehyde in aqueous sulfurous acid used in Example 7 replaced the aqueous solution of adipaldehyde of Example 6, so also in any of the Examples 10 through 17 the respective substituted pyran can be replaced by an aqueous solution of its corresponding water-soluble sulfurous acid salt.

In the appended claims the expression "a sugar" is used in the broad sense to embrace not only any of the various individual sugars having at least four hydroxyl groups occurring in pairs, in each of which pairs the hydroxyls are separated by less than four carbons, but also mixtures of any of them as well as such commercial mixtures that contain some of them, as exemplified by molasses, spent sulfite liquor (with or without any of its lignosulfonates removed), saccharified wood products, and the like.

This application is a continuation-in-part of my co-pending application Serial No. 171,255 filed June 29, 1950.

While the invention has been explained by describing in detail certain specific embodiments of it, it is understood that various modifications and substitutions can be made in any of them within the scope of the appended claims which are intended also to embrace equivalents of the specific embodiments.

What is claimed is:

1. A process for preparing a solvent-soluble condensation product of a dialdehyde and a sugar, which comprises allowing a dialdehyde and a sugar having at least four hydroxyl groups so relatively positioned as to present at least two pairs of hydroxyls, with each pair having its hydroxyls separated by under four carbon atoms, to react together in a ratio such that there are at least three to about sixteen moles of hydroxyl group in the sugar reactant per mol of aldehyde, in a reaction medium which has a pH below that which exceeds pH 7 and is a solvent for at least one of the reactants, at an elevated temperature from about 50° C. to under that at which decomposition of either reactant occurs, and for a time sufficient for them to condense together with the elimination of water; and removing the water of condensation thus formed and also any other water introduced as reaction medium; thereby obtaining a solvent-soluble condensation product of the dialdehyde and the sugar.

2. The process as claimed in claim 1, wherein the dialdehyde is obtained in situ from the hydrolysis of a precursor of a dialdehyde.

3. The process as claimed in claim 1, wherein the condensation reaction is conducted in the absence of a condensation catalyst.

4. The process as claimed in claim 1, wherein the condensation reaction is conducted in the presence of an acid condensation catalyst in a molal concentration under about one-tenth of the total number of moles of both the sugar and dialdehyde.

5. The process as claimed in claim 1, wherein the solvent for at least one of the reactants is a member of the class consisting of water, dioxane, tetrahydrofurane, and diethylene glycol.

6. The process as claimed in claim 2, wherein the precursor of the dialdehyde is a pyran member of the class consisting of (a) 2-ethoxy-4-methyl-3,4-dihydro-1,2-pyran, (b) 2,3-dihydro-2-ethoxy-1,4-pyran, and (c) 2,3-dihydro-2-ethoxy-4-methyl-1,4-pyran.

7. The process as claimed in claim 3, wherein the reaction is conducted under pressure and in the absence of a solvent, and the dialdehyde is produced in situ by the hydrolysis of a precursor of a dialdehyde.

8. The process as claimed in claim 5, wherein the dialdehyde is aliphatic.

9. The process as claimed in claim 8, wherein the dialdehyde is glutaraldehyde.

10. The process as claimed in claim 8, wherein the dialdehyde is alpha-hydroxy adipaldehyde.

11. The process as claimed in claim 8, wherein the dialdehyde is glyoxal.

12. A solvent-soluble resin condensation product of the elimination of water between the aldehyde groups of a dialdehyde and paired hydroxyl groups of a sugar having at least four hydroxyl groups so relatively positioned as to present at least two pairs of hydroxyls with each pair having its hydroxyls separated by under four carbons, the ratio between them having been such that there are at least three to about sixteen moles of hydroxyl group in the sugar per mol of dialdehyde, which product has a chain of alternate dialdehyde and sugar residues of such elimination of water between them, whereby these residues are joined through the cyclic acetal rings remaining from the elimination of the water between each aldehyde group of the dialdehyde respectively with a pair of hydroxyls of the sugar.

13. A solvent-soluble resin condensation product as claimed in claim 12, wherein the dialdehyde residues are those of an aliphatic dialdehyde.

14. A solvent-soluble product as claimed in claim 13, wherein the dialdehyde residues are those from glutaraldehyde.

15. A solvent-soluble product as claimed in claim 13, wherein the dialdehyde residues are those from glyoxal.

16. A solvent-soluble product as claimed in claim 13, wherein the dialdehyde residues are those of an adipaldehyde.

17. A solvent-soluble product as claimed in claim 13, wherein the dialdehyde residues are those of alpha-hydroxyadipaldehyde.

18. A printing ink consisting essentially of:

| | Parts by weight |
|---|---|
| Printing ink pigment | About 15 to about 20. |
| Solvent-soluble resin condensation product as claimed in claim 12 | About 35 to about 45. |
| Solvent for the resin condensation product | About 35 to about 50. |
| Acid catalyst | About 6 to about 9. |

19. A printing ink consisting essentially of:

| | Percent by weight |
|---|---|
| Printing ink pigment | About 15 to about 20. |
| Glyoxal sucrose resin (soluble condensation product of Example 5) | About 40. |
| Solvent for the glyoxal sucrose resin | About 40 to about 45. |
| Acid catalyst | About 7.5 of the resin. |

20. A printing ink consisting essentially of:

| | Percent by weight |
|---|---|
| Carbon black | About 15 to about 20. |
| Glyoxal sucrose resin (soluble condensation product of Example 5) | About 40. |
| Propylene glycol | About 40 to about 45. |
| Boron fluoride etherate | 7.5 of the resin. |

References Cited in the file of this patent

UNITED STATES PATENTS

| 2,702,823 | Smith et al. | Feb. 22, 1955 |

FOREIGN PATENTS

| 842,075 | Germany | Mar. 25, 1953 |

OTHER REFERENCES

"Aldehydes," published by Union Carbide and Carbon Corp., February 1946, page 4.

Read: Journal of the Chemical Society (London), volume 101, pages 2090–2094.

Shell Development Company, "Acrolein" Report No. S-13149, Supplement to S-9941, pages 6 and 7.

UNITED STATES PATENT OFFICE

CERTIFICATE OF CORRECTION

Patent No. 2,944,034                      July 5, 1960

Ronald J. Baird

It is hereby certified that error appears in the printed specification of the above numbered patent requiring correction and that the said Letters Patent should read as corrected below.

Column 1, line 41, after "sugar" insert -- used --; column 2, line 63, right-hand portion of the formula, for "-CH" read 
$$-\underset{\underset{O}{\parallel}}{C}H$$
 --; column 5, lines 46 to 54, the formula should appear as shown below instead of as in the patent:

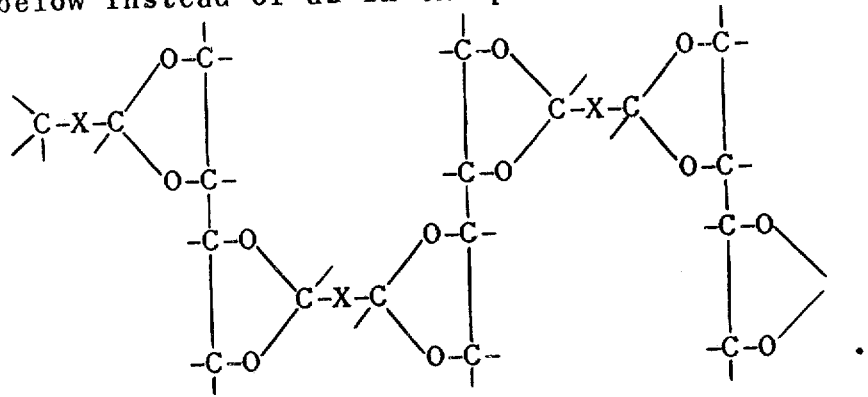

Signed and sealed this 18th day of April 1961.

(SEAL)
Attest:

ERNEST W. SWIDER
Attesting Officer

DAVID L. LADD
Commissioner of Patents